(12) United States Patent
Kim

(10) Patent No.: US 8,726,466 B2
(45) Date of Patent: May 20, 2014

(54) HOOD HINGE APPARATUS FOR VEHICLE

(71) Applicant: Hyundai Motor Company, Seoul (KR)

(72) Inventor: Do Hoi Kim, Uiwang-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/730,158

(22) Filed: Dec. 28, 2012

(65) Prior Publication Data

US 2014/0026369 A1    Jan. 30, 2014

(30) Foreign Application Priority Data

Jul. 30, 2012 (KR) .................. 10-2012-0083255

(51) Int. Cl.
*E05D 5/02* (2006.01)
*B62D 25/12* (2006.01)
*B62D 25/10* (2006.01)
*B62D 25/08* (2006.01)
*B60R 21/34* (2011.01)

(52) U.S. Cl.
USPC ............ 16/387; 16/223; 180/69.21; 180/274; 296/187.09; 296/193.11

(58) Field of Classification Search
USPC ................... 16/387, 388, 389, 392, 222, 223; 296/187.03, 187.04, 187.09, 193.11, 296/146.11, 192; 180/69.2, 69.21, 274
See application file for complete search history.

(56) References Cited

U.S. PATENT DOCUMENTS

| | | | | | |
|---|---|---|---|---|---|
| 2,204,991 | A | * | 6/1940 | Haltenberger | 180/69.21 |
| 3,596,978 | A | * | 8/1971 | Wessells et al. | 296/203.02 |
| 3,643,755 | A | * | 2/1972 | Gionet et al. | 180/69.21 |
| 3,893,207 | A | * | 7/1975 | Rudaitis et al. | 180/69.21 |
| 4,012,807 | A | * | 3/1977 | Kern | 16/288 |
| 4,545,612 | A | * | 10/1985 | Harasaki | 296/203.02 |
| 4,723,811 | A | * | 2/1988 | Harasaki | 296/203.02 |
| 4,727,621 | A | * | 3/1988 | Emery et al. | 16/239 |
| 6,139,092 | A | * | 10/2000 | Doner et al. | 296/187.09 |
| 6,834,735 | B2 | * | 12/2004 | Kim | 180/69.21 |
| 6,880,667 | B2 | * | 4/2005 | Gotou | 180/291 |
| 7,036,874 | B2 | * | 5/2006 | Stojkovic et al. | 296/193.09 |
| 7,740,097 | B2 | * | 6/2010 | Takahashi et al. | 180/274 |
| 8,083,270 | B2 | * | 12/2011 | Hwang | 292/128 |
| 8,167,362 | B2 | * | 5/2012 | Furumoto | 296/193.1 |
| 8,336,666 | B2 | * | 12/2012 | Thomas | 180/274 |

(Continued)

FOREIGN PATENT DOCUMENTS

| | | | | |
|---|---|---|---|---|
| EP | 1164072 A1 | * | 12/2001 | |
| EP | 1743827 A2 | * | 1/2007 | B60R 21/34 |

(Continued)

*Primary Examiner* — Victor Batson
*Assistant Examiner* — Jason W San
(74) *Attorney, Agent, or Firm* — Morgan, Lewis & Bockius LLP

(57) ABSTRACT

A hood hinge apparatus for a vehicle, in which a cowl-side body connected with an A-pillar has an inclined structure or an angular structure having a larger inclination than a right angle to reduce a step between the A-pillar and the cowl-side body, and engagement bolts are engaged with a horizontal inclined surface and a vertical inclined surface in different directions for coupling between the cowl-side body and the fixed hinge bracket to prevent injury of a passenger due to excessive dipping caused by generation of body bending during a front offset collision, thereby actively responding to safety regulations in case of a collision.

3 Claims, 4 Drawing Sheets

A - A Cross-Sectional Portion

(56) References Cited

U.S. PATENT DOCUMENTS

| | | | |
|---|---|---|---|
| 8,398,125 B2* | 3/2013 | Takahashi et al. | 292/45 |
| 2002/0060474 A1* | 5/2002 | Chung | 296/189 |
| 2002/0170759 A1* | 11/2002 | Son | 180/69.21 |
| 2006/0151228 A1* | 7/2006 | Kalliske et al. | 180/274 |
| 2007/0062748 A1* | 3/2007 | Erwin | 180/69.21 |
| 2008/0302591 A1* | 12/2008 | Herzog et al. | 180/274 |
| 2009/0158553 A1* | 6/2009 | Narducci et al. | 16/223 |
| 2009/0289473 A1* | 11/2009 | Kmieciak | 296/193.11 |
| 2010/0005628 A1* | 1/2010 | Jung | 16/386 |
| 2010/0101048 A1* | 4/2010 | Thomas | 16/223 |
| 2013/0169003 A1* | 7/2013 | Kubo et al. | 296/187.09 |
| 2013/0214561 A1* | 8/2013 | Chaufour et al. | 296/207 |

FOREIGN PATENT DOCUMENTS

| | | | |
|---|---|---|---|
| EP | 2540597 A2 * | 1/2013 | |
| FR | 2910871 A1 * | 7/2008 | |
| JP | 06-191441 A | 7/1994 | |
| JP | 09104361 A * | 4/1997 | |
| JP | 2000-108842 A | 4/2000 | |
| JP | 2007055504 A * | 3/2007 | |
| JP | 2007296883 A * | 11/2007 | |
| JP | 2008-087508 A | 4/2008 | |
| JP | 2010274745 A * | 12/2010 | |
| JP | 2011-131703 A | 7/2011 | |
| JP | 2011143819 A * | 7/2011 | |
| JP | 2012091746 A * | 5/2012 | |
| JP | 2013052816 A * | 3/2013 | |

* cited by examiner

A - A Cross-Sectional Portion

B - B Cross-Sectional Portion

HOOD HINGE APPARATUS FOR VEHICLE

CROSS-REFERENCE TO RELATED APPLICATION

The present application claims priority of Korean Patent Application Number 10-2012-0083255 filed Jul. 30, 2012, the entire contents of which application is incorporated herein for all purposes by this reference.

BACKGROUND OF INVENTION

1. Field of Invention

The present invention relates to a hood hinge apparatus for a vehicle, by which crash performance can be improved in case of a front offset collision.

2. Description of Related Art

Recently, according to vehicle safety regulations to be executed in Europe and North America in 2014, front/offset crash performance has been improved.

As part of active adaptation to the enhancement in front/offset crash performance, the occurrence of a collision between a hood hinge and an A-pillar needs to be remedied.

It is also necessary to prevent injury of a passenger due to excessive dipping caused by vehicle-body bending of a front portion of the hood hinge.

FIGS. 1 and 2 are a perspective view and a side view of a hood hinge apparatus according to prior art, in which the hood hinge apparatus includes a fixed hinge bracket 2 engaged by a bolt to a cowl-side body 1, a movable hinge bracket 3 engaged to a hood 5, and a hinge pin 4 through-coupled to a top end of the fixed hinge bracket 2 and an end portion of the movable hinge bracket 3, such that the hood 5 is opened and closed by rotation of the movable hinge bracket 3.

However, an A pillar 6 and the cowl-side body 1 are connected in perpendicular to each other and a height-wise step between the A-pillar 6 and the body 1 is large, such that in case of a front collision, the hood hinge directly collides with the A-pillar 6 and much collision energy is generated between the hood hinge and the A-pillar 6 without being transferred from the cowl-side body 1 to the A-pillar 6.

As a result, due to generation of the body bending, excessive dipping in the shape of V occurs, increasing passenger's injury.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present invention has been made to solve the foregoing problems, and provides a hood hinge apparatus for a vehicle, in which a cowl-side body connected with an A-pillar is formed to have an inclined structure or an angular structure having a larger inclination than a right angle to reduce a step between the A-pillar and the cowl-side body, and engagement bolts are engaged with a horizontal inclined surface and a vertical inclined surface in different directions for coupling between the cowl-side body and the fixed hinge bracket to prevent injury of a passenger due to excessive dipping caused by generation of body bending during a front offset collision, thereby actively responding to safety regulations in case of a collision.

According to an aspect of the present invention, there is provided a hood hinge apparatus for a vehicle, the hood hinge apparatus including a cowl-side body connection portion which is a connection portion with an A-pillar and comprises an angular structure by intersecting a horizontal inclined surface and a vertical inclined surface, a fixed hinge bracket formed by a combination of a horizontal inclination member with a vertical inclination member, the fixed hinge bracket surface-contacting the body connection portion in such a way to form an angular structure, and bolts coupled to the horizontal inclination member and the vertical inclination member, respectively, to engage the fixed hinge bracket with the body connection portion.

In particular, the hood hinge apparatus further includes a body bead formed on a vertical inclined surface of the body connection portion and a coupling groove formed in the vertical inclination member of the fixed hinge bracket, in which collision energy is transferred from the body connection portion to the A-pillar through coupling between the body bead and the coupling groove, thus improving crash performance.

The fixed hinge bracket includes an inner member disposed on a plane on which an inner end portion of the horizontal inclination member and an inner end portion of the vertical inclination member intersect each other and a flange portion formed on outer lateral end portions of the horizontal inclination member and the vertical inclination member, thereby improving lateral crash performance in a front offset collision.

The fixed hinge bracket includes a protrusion portion formed in a bulging way between the inner member and the horizontal inclination member to alleviate an impact on a walker in case of a collision with the walker.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
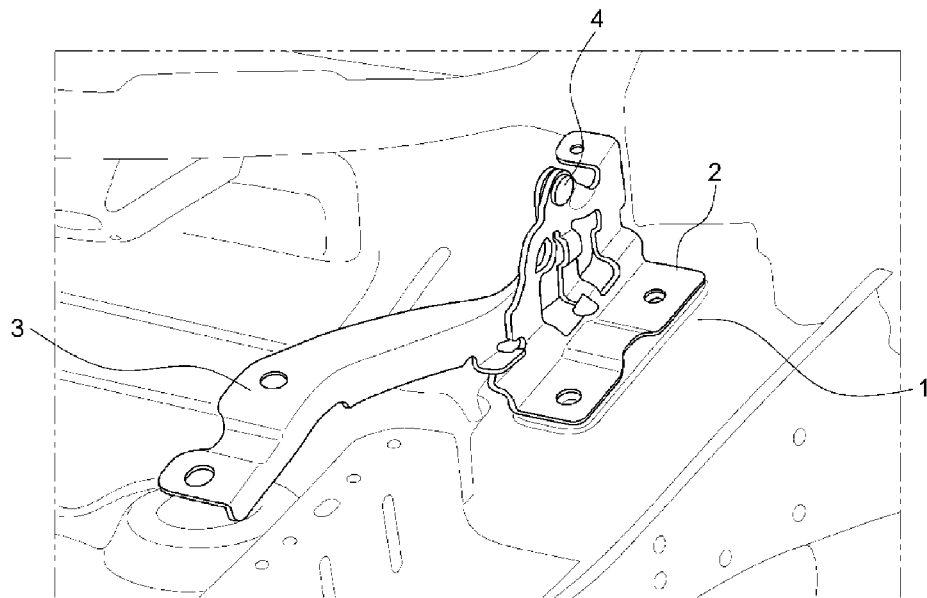
FIG. 1 is a perspective view of a conventional hood hinge apparatus.
Figure 2:
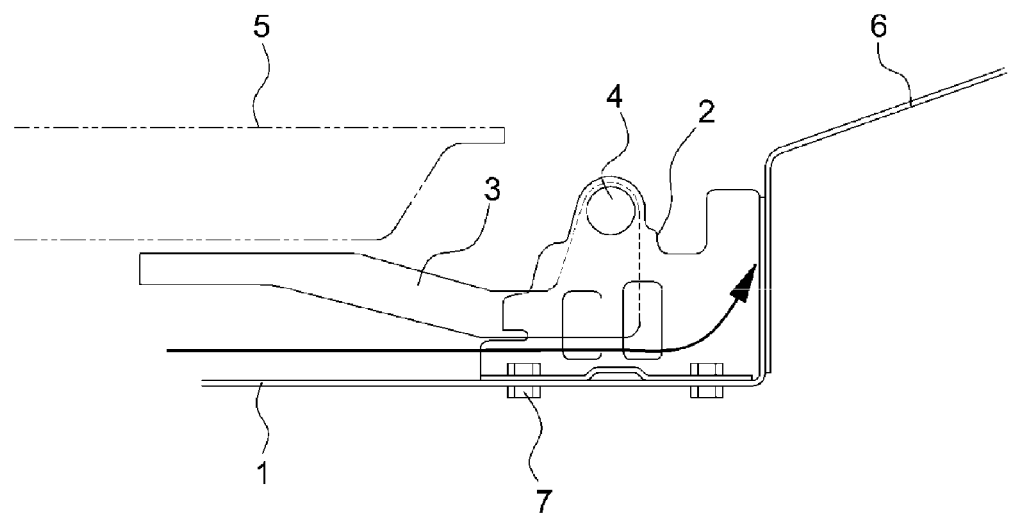
FIG. 2 is a schematic diagram for describing occurrence of a collision between a hood hinge and an A-pillar in FIG. 1.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 3:
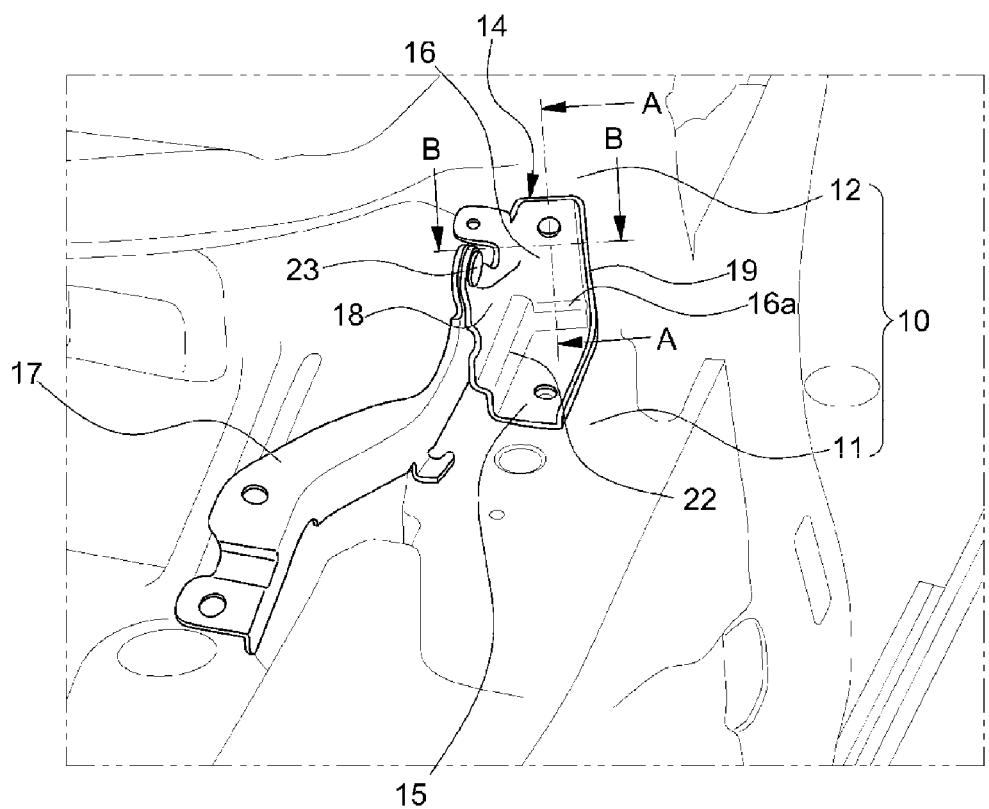
FIG. 3 is a perspective view of a hood hinge apparatus for a vehicle according to the present invention.
Figure 4:
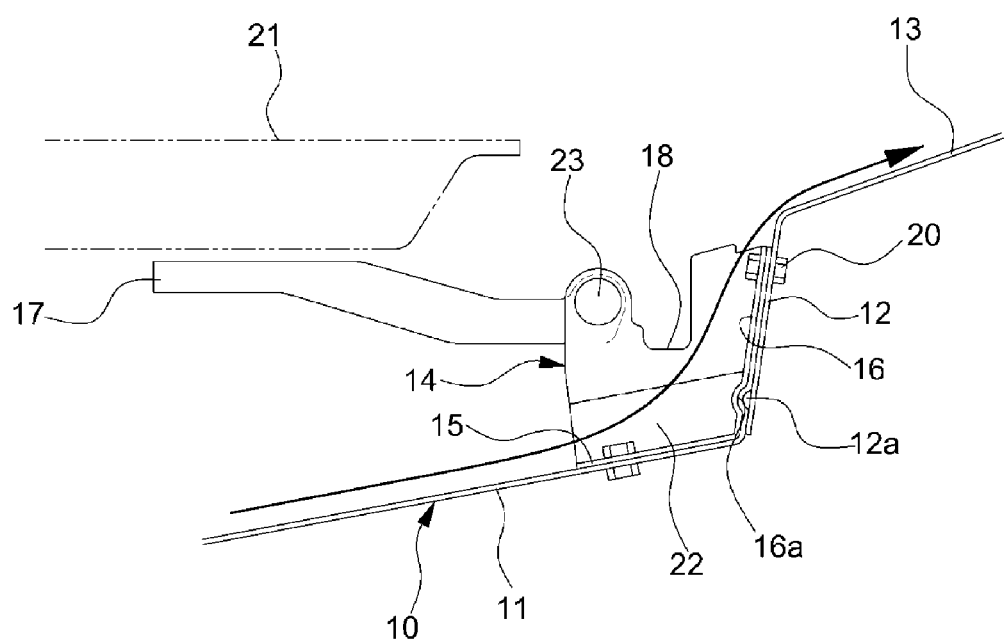
FIG. 4 is a schematic view showing transfer of collision energy from a cowl-side body connection portion to an A-pillar in case of a collision in FIG. 3.
Figure 5:
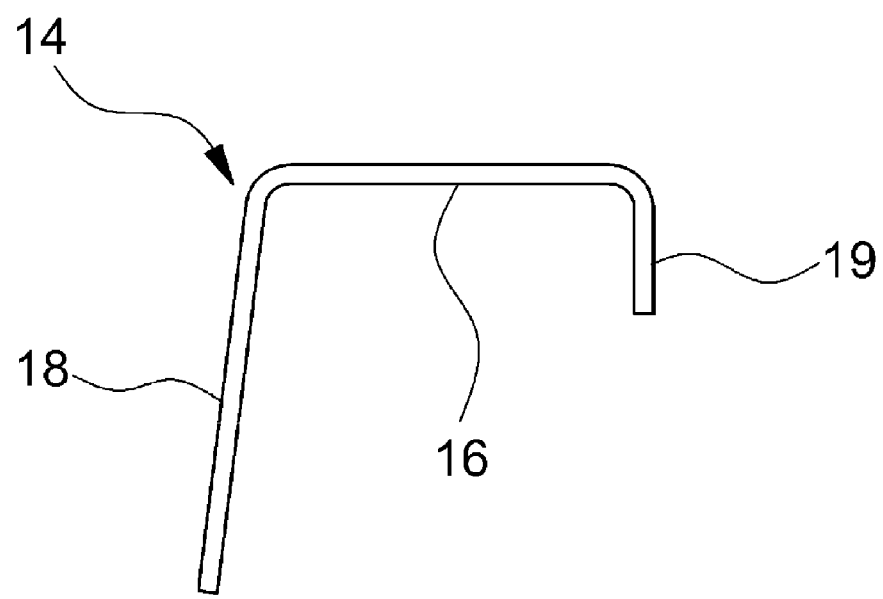
FIG. 5 is a plane view of a fixed hinge bracket in FIG. 3.

FIG. 3 is a perspective view of a hood hinge apparatus for a vehicle according to the present invention, FIG. 4 is a schematic view showing transfer of collision energy from a cowl-side body connection portion to an A-pillar in case of a collision in FIG. 3, and FIG. 5 is a plane view of a fixed hinge bracket in FIG. 3.

The present invention relates to a hood hinge apparatus for a vehicle, which is capable of improving front offset crash performance.

A cowl-side body connection portion 10 (cowl-side outer panel) for connection with an A-pillar 13 according to the present invention is connected to the A-pillar 13 in an angular structure with respect to each other by combining a horizontal inclined surface 11 and a vertical inclined surface 12, such that in case of a front offset collision, generation of body bending can be minimized when compared to conventional perpendicular connection between the A-pillar 3 and the body.

For example, the horizontal inclined surface 11 of the cowl-side body is inclinedly formed upwardly toward the A-pillar 13 with respect to a horizontal line in a body's lengthwise direction, and the vertical inclined surface 12 connected to the A-pillar 13 is slightly inclinedly formed downwardly toward the A-pillar 13 with respect to a vertical line in a body's height-wise direction from an end of the horizontal inclined surface 11. The horizontal inclined surface 11 of the cowl side and the vertical inclined surface 12 of the connection side of the A-pillar 13 form an angle which is slightly larger than about 90° therebetween.

The hood hinge apparatus includes a movable hinge bracket 17 connected to a hood 21, a fixed hinge bracket 14 connected to a vehicle body, and a hinge pin 23 for rotatably coupling the movable hinge bracket 17 to the fixed hinge bracket 14.

Herein, the fixed hinge bracket 14 includes a horizontal inclination member 15 surface-contacting the cowl-side horizontal inclined surface 11, a vertical inclination member 16 surface-contacting the A-pillar connection side vertical inclined surface 12, an inner member 18 disposed on inner lateral sides of the horizontal inclination member 15 and the vertical inclination member 16, and a flange portion 19 formed on outer lateral end portions of the horizontal and vertical inclination members 15 and 16.

Bolt holes are formed in the horizontal inclination member 15 and the vertical inclination member 16, respectively, and are engaged by bolts 20 through the bolt holes.

The bolts 20 are engaged perpendicularly with the horizontal inclination member 15 and the vertical inclination member 16, respectively.

For example, an engagement direction of the bolts 20 (the length-wise direction of the bolts 20) engaged to the horizontal inclination member 15 is close to the vertical direction, and an engagement direction of the bolts 20 (the length-wise direction of the bolts 20) engaged to the vertical inclination member 16 is close to the horizontal direction (body's lengthwise direction).

An engagement structure of the fixed hinge bracket 14 according to the present invention will be compared with that of the conventional fixed hinge bracket.

In case of the conventional fixed hinge bracket 14, two bolts are engaged in parallel on a cowl-side horizontal plane, such that body bending excessively occurs; whereas, in case of the fixed hinge bracket 14 according to the present invention, one of the bolts 20 engaged to the fixed hinge bracket 14 is inclinedly engaged to the A-pillar connection vertical inclined surface 12 downwardly towards the A-pillar 13 with respect to the horizontal line, and the other bolt 20 is inclinedly engaged to the cowl-side body horizontal plane in the height-wise direction forward and backward with respect to the vertical line, that is, the two bolts 20 are engaged to the horizontal inclined surface 11 and the vertical inclined surface 12 with an angular corner formed by the horizontal inclined surface 11 and the vertical inclined surface 12 therebetween, thereby more firmly engaging the fixed hinge bracket 14 with the vehicle body and thus minimizing the body bending caused by the fixed hinge bracket 14 in case of a front offset collision.

The vertical inclination member 16 of the fixed hinge bracket 14 also includes a coupling groove 16a, and a body bead 12a protrudes on a vertical inclined surface of the body connected to the A-pillar 13 to correspond to the coupling groove 16a, thereby easily engaging the fixed hinge bracket 14 with the vehicle body and serving as a bridge for transfer of collision energy between the fixed hinge bracket 14 and the body in case of a front offset collision.

The inner member 18 disposed on the inner lateral sides of the horizontal inclination member 15 and the vertical inclination member 16 of the fixed hinge bracket 14 and the flange portion 19 disposed on the outer side of the vertical inclination member 16 are formed to be spaced apart from each other by a width of the vertical inclination member 16 therebetween, thereby improving resistance against a collision exerted laterally in case of a front offset collision.

In addition, a protrusion portion 22 is formed in a bulging shape on a corner portion at which the inner member 18 and the horizontal inclination member 15 of the fixed hinge bracket 14 are connected, such that if a body part of a walker, e.g., a head portion collides with a hinge of the hood 21 due to a collision with the walker, the bulging protrusion portion 22 absorbs collision energy transferred in upward and downward directions, thereby alleviating an impact on the walker in case of the collision with the walker.

Therefore, according to the present invention, the cowl-side body connected with the A-pillar 13 is formed to be bent in an inclined structure, and the fixed hinge bracket 14 is also formed in an inclined structure and is bent to surface-contact the cowl-side body in the inclined structure, such that the bolts 20 are engaged to the horizontal inclination member 15 and the vertical inclination member 16 of the fixed hinge bracket 14, thereby transferring and dispersing collision energy from the hood hinge to the A-pillar 13 by improving the conventional body structure perpendicularly connected to the A-pillar and the conventional engagement structure of the fixed hinge bracket, and thus improving crash performance.

As is apparent from the foregoing description, the cowl-side body connected with the A-pillar is formed to be bent in an inclined structure, and the fixed hinge bracket is also formed in an inclined structure and is bent to surface-contact the cowl-side body in the inclined structure, such that the bolts are engaged to the horizontal inclination member and the vertical inclination member of the fixed hinge bracket, thereby transferring and dispersing collision energy from the hood hinge to the A-pillar by improving the conventional body structure perpendicularly connected to the A-pillar and the conventional engagement structure of the fixed hinge bracket, and thus improving crash performance.

For convenience in explanation and accurate definition in the appended claims, the terms front and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An assembly of a hood hinge apparatus and a cowl-side body connection portion for a vehicle, the cowl-side body connection portion including an A-pillar, the assembly comprising:
    a horizontal inclined surface and a vertical inclined surface of the cowl-side body connection portion;
    a fixed hinge bracket formed by a combination of a horizontal inclination member with a vertical inclination member, the fixed hinge bracket being in surface—contacting with the body connection portion in such a way to form an angular structure; and
    bolts coupled to the horizontal inclination member and the vertical inclination member, respectively, to engage the fixed hinge bracket with the body connection portion;
    a body bead formed on the vertical inclined surface of the cowl-side body connection portion; and
    a coupling groove formed in the vertical inclination member of the fixed hinge bracket, wherein collision energy is transferred from the body connection portion to the A-pillar through coupling between the body bead and the coupling groove, thus improving crash performance;
    wherein the angular structure is configured such that the horizontal inclined surface of the cowl-side body is inclinedly formed upwardly toward the A-pillar with respect to a horizontal line in a body's length-wise direction, the vertical inclined surface connected to the A-pillar is inclinedly fanned downwardly toward the A-pillar with respect to a vertical line in a body's height-wise direction from an end of the horizontal inclined surface, and the horizontal inclined surface of the cowl side and the vertical inclined surface of the connection side of the A-pillar form an angle which is larger than about 90° therebetween;
    wherein the horizontal inclined surface and the vertical inclined surface are in surface contact with the horizontal inclination member and the vertical inclination member of the fixed hinge bracket, respectively.

2. The assembly of claim 1, wherein the fixed hinge bracket comprises:
    an inner member disposed on a plane on which an inner end portion of the horizontal inclination member and an inner end portion of the vertical inclination member intersect each other; and
    a flange portion disposed on outer lateral end portions of the horizontal inclination member and the vertical inclination member, thereby improving lateral crash performance in a front offset collision.

3. The assembly of claim 2, wherein the fixed hinge bracket comprises a protrusion portion formed in a bulging way between the inner member and the horizontal inclination member to alleviate an impact on a walker in case of a collision with the walker.

* * * * *